(12) United States Patent
Soryal

(10) Patent No.: US 12,182,600 B2
(45) Date of Patent: Dec. 31, 2024

(54) SYSTEM AND METHOD FOR CREATING AND USING FLOATING VIRTUAL MACHINES

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 799 days.

(21) Appl. No.: 17/174,442

(22) Filed: Feb. 12, 2021

(65) Prior Publication Data
US 2022/0261265 A1   Aug. 18, 2022

(51) Int. Cl.
G06F 9/455   (2018.01)

(52) U.S. Cl.
CPC .............. *G06F 9/45558* (2013.01); *G06F 2009/45562* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 7,383,405 B2* | 6/2008 | Vega | ..................... | G06F 9/4856 711/202 |
| 8,195,774 B2* | 6/2012 | Lambeth | ............. | G06F 9/45558 709/220 |
| 8,201,166 B2* | 6/2012 | Garrett | ..................... | G06F 9/455 718/1 |
| 8,327,355 B2* | 12/2012 | Dow | .................... | G06F 9/45533 718/1 |
| 8,364,460 B2* | 1/2013 | Ostermeyer | ........ | G06F 9/45558 718/1 |
| 8,413,147 B2* | 4/2013 | Shen | .................... | G06F 9/45558 718/1 |
| 8,984,123 B2* | 3/2015 | Machida | ............. | G06F 9/45558 709/224 |
| 9,183,030 B2* | 11/2015 | Nicholas | ............. | G06F 9/45558 |
| 9,465,639 B2* | 10/2016 | Chen | ..................... | G06F 9/5088 |
| 9,507,612 B1* | 11/2016 | Henry | .................... | G06F 9/5027 |
| 9,513,945 B2* | 12/2016 | Shimogawa | ........ | H04L 12/4645 |
| 9,626,206 B2* | 4/2017 | Bennett | ................. | G06F 9/4856 |
| 9,710,305 B2* | 7/2017 | Cropper | ................ | G06F 9/5088 |
| 10,135,712 B2* | 11/2018 | Wu | ......................... | H04L 67/10 |
| 10,567,260 B2* | 2/2020 | Wu | ......................... | H04L 43/20 |

(Continued)

*Primary Examiner* — Van H Nguyen
(74) *Attorney, Agent, or Firm* — Guntin & Gust, PLC; Mark Wilinski

(57) ABSTRACT

A system includes a plurality of interconnected hardware platforms, wherein the plurality of hardware platforms are configured to run a software defined network, a plurality of virtual machines configured to be instantiated on the software defined network, and a plurality of floating management layers, each of the floating management layers associated with one of the plurality of virtual machines. Each floating management layer includes coupling the associated virtual machine to one of the plurality of hardware platforms, monitoring performance of the associated virtual machine, detecting a trigger, based on the trigger, determining whether to move the virtual machine to a second of the plurality of hardware platforms, and moving the virtual machine.

18 Claims, 14 Drawing Sheets

(56) References Cited

U.S. PATENT DOCUMENTS

| | | | |
|---|---|---|---|
| 11,269,677 B2* | 3/2022 | Paul | G06F 9/4893 |
| 2008/0059556 A1* | 3/2008 | Greenspan | G06F 9/5077 |
| | | | 709/201 |
| 2012/0284713 A1* | 11/2012 | Ostermeyer | G06F 9/45558 |
| | | | 718/1 |
| 2013/0185420 A1* | 7/2013 | Shimogawa | H04L 12/4645 |
| | | | 709/224 |
| 2016/0170791 A1* | 6/2016 | Huh | G06F 9/45558 |
| | | | 718/1 |
| 2021/0042140 A1* | 2/2021 | Paul | G06F 1/3206 |

* cited by examiner

SYSTEM AND METHOD FOR CREATING AND USING FLOATING VIRTUAL MACHINES

TECHNICAL FIELD

This disclosure is directed to systems and methods for creating and using floating virtual machines to enable the fast moving of a virtual machine to different geographical locations to better serve the subscribers.

BACKGROUND

Memory access attacks in which malicious software code is able to gather information by the pattern of a virtual machine (VM) accessing certain parts of memory of the underlying hardware platform. Such patterns may include the frequency, location and method of accessing memory by the VM of certain parts of the memory. Malicious code may also include analytics to assist in recognizing such patterns. From the pattern in which VMs accesses its memory banks, adversaries are able to infer the type of data that is stored there, even if the data itself is not visible. As such, that data becomes vulnerable to theft.

In software defined network architectures, virtual machines (VM) are bound to an underlying hardware platform. Such hardware platforms include central processing units ("CPUs") and memory. In order to move the VM physically from a first hardware platform in one location to a second hardware platform in another location, a complex process has to take place to break that binding and build the VM in the other location consumes time and resources.

There is a need to develop a system and method to efficiently move VMs from a first hardware platform in one geographic location to a second hardware platform in another geographic location.

SUMMARY

The present disclosure is directed to a system including a plurality of interconnected hardware platforms, wherein the plurality of hardware platforms is configured to run a software defined network, a plurality of virtual machines configured to be instantiated on the software defined network, and a plurality of floating management layers, each of the floating management layers associated with one of the plurality of virtual machines, wherein each floating management layer is in communication with other virtual management layers, and wherein each virtual management layer may include an input-output interface, a processor coupled to the input-output interface wherein the processor is further coupled to a memory, the memory having stored thereon executable instructions that when executed by the processor cause the processor to effectuate operations including coupling the associated virtual machine to one of the plurality of hardware platforms, monitoring performance of the associated virtual machine, detecting a trigger, and based on the trigger, determining whether to move the virtual machine to a second of the plurality of hardware platforms. The determining step may include communicating with at least one other floating management layer and wherein the communicating step may include determining if another virtual machine is scheduled to move to the second of the plurality of hardware platforms, and the operations further comprise comparing performance of the associated virtual machine and the another virtual machine on the second of the plurality of hardware platforms. The operations may further comprise selecting whether the associated virtual machine or the another virtual machine should move to the second of the plurality of hardware platforms based on the comparing step. In an aspect, the communicating step may include communicating with the plurality of floating management layers and wherein the operations further comprise coordinating the interaction of the plurality of virtual machines. The communicating step may include communicating with the plurality of floating management layers and wherein the operations further comprise tracking the location of the plurality of virtual machines. The operations may further comprise coordinating movement of one or more of the plurality of virtual machines to other of the plurality of hardware platforms.

In an aspect, the system may include moving the associated virtual machine to the second of the plurality of hardware platforms, wherein the operations further include testing anticipated performance of the associated virtual machine on the second of the plurality of hardware platforms prior to the moving step. The testing step may include comparing anticipated delay times of the associated virtual machine when running on the one of the plurality of hardware platforms and when running on the second of the plurality of hardware platforms. In an aspect, the trigger is a degradation of performance of the associated virtual machine or may be one of a change in energy consumption, environmental conditions, or maintenance. The system may also include moving the associated virtual machine to the second of the plurality of hardware platforms before disabling operation of the associated virtual machine on the one of the plurality of hardware platforms.

The present disclosure is also directed to a method, including instantiating a plurality of virtual machines on a plurality of hardware platforms, attaching a floating management layer to each of the plurality of virtual machines, coupling each virtual machine to one of the plurality of hardware platforms through the attached floating management layer, monitoring performance of the plurality of virtual machines through each of the attached floating management layers, and coordinating movement of the plurality of virtual machines among the plurality of hardware platforms. The method may further including detecting a trigger, and wherein the coordinating step is based on the trigger. The trigger may be detected by a first floating management layer and a second trigger may be detected by a second floating management layer and where the coordinating step may include comparing anticipated performance of a first virtual machine attached to the first floating management layer and a second virtual machine attached to the second floating management layer on a targeted hardware platform. The method may further include moving the first virtual machine or the second virtual machine is based on the comparing step. The method may further include decoupling one of the each virtual machines from one of the plurality of hardware platforms and coupling the one of the each virtual machines to a second of the plurality of hardware platforms.

The present disclosure is directed to a system including a plurality of interconnected hardware platforms, wherein the plurality of hardware platforms is configured to run a software defined network, a plurality of virtual machines configured to be instantiated on the software defined network, and a plurality of floating management layers, each of the floating management layers configured to attach to each of the plurality of virtual machines and wherein each of the floating management layers is configured to couple the attached virtual machine to one of the plurality of hardware platforms. Each of the floating management layers may be configured to move the attached virtual machine to a second of the plurality of hardware platforms prior to disabling the attached virtual machine on the one of the plurality of hardware platforms.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION OF ILLUSTRATIVE EMBODIMENTS

Figure 1:
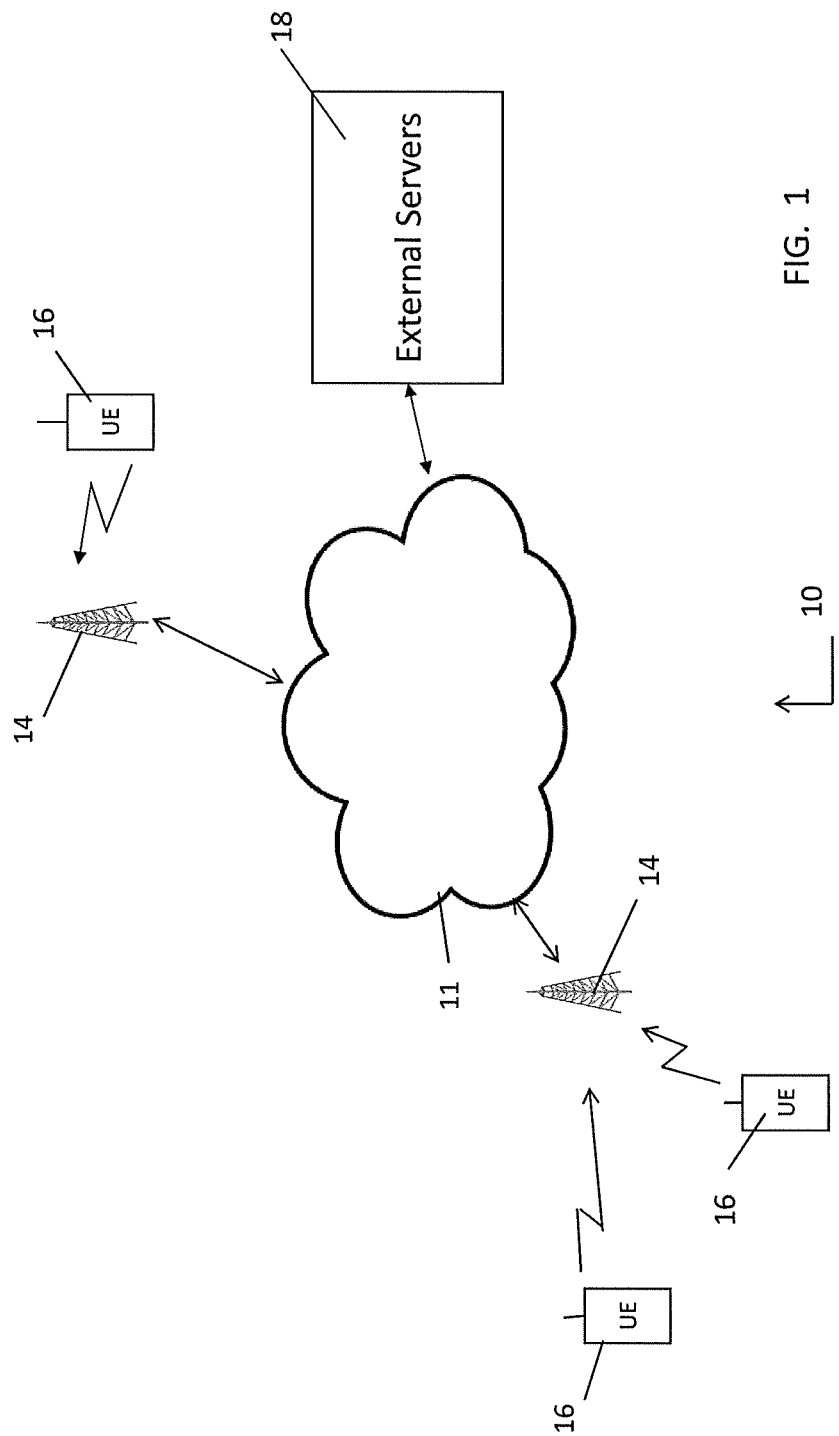
FIG. 1 illustrates an exemplary operating environment of the present disclosure.

System Overview. This disclosure is directed to a novel system by which a floating management layer ("FML") is created and disposed between a virtual machine (VM) and the hardware platform on which the VMs run. The floating management layer separates the tight connection between a VM and the hardware platform to provide additional flexibility for network operators in managing networks. For purposes of this disclosure, a hardware platform is the hardware upon which a VM is instantiated and runs. Such a hardware platform may also be referred to as hardware resources herein and is represented in the appended figures as boxes labeled CPU/Memory. As such, the disclosure provides a practical application to solve a problem and advance the state of the telecommunications and virtualization art.

The disclosure introduces the concept of floating VMs in a given space whereby the hard association or binding between the VM and the hardware resources supporting the VM are detached. To make this happen, a new concept is introduced which is a floating management layer which is a software layer attached to and positioned beneath each VM and above the hardware platform. The FML is an intelligent software layer that will ensure that the VM is connected to hardware resources at any given time to avoid disruption of services and will be able to physically or logically connect the associated VM to a hardware platform. The FML will permit the associated VM to instantiate itself at a different location as necessary or desired.

The HW platform compromises one or more central processing units (CPUs), memory storage, and network interfaces. There may be two separate uses of memory storage, namely at the physical location where the VM resides, referred to as VMR memory, and resources that the VM uses, including process computations and data caching.

Since each VM has its own FML, then within a given HW space, all FMLs may coordinate with each other to find the best physical location for each VM. This may be similar to a game theory cooperative approach where each node is attempting to find the best choice for itself and others on the same network.

The disclosure provides operational flexibility by removing the hard binding between a VM and the hardware on which it is running. This flexibility may be realized in the case of a memory access or other hardware attack. Moreover, policies may be set that define triggers for one or more of the FMLs which are in communication with each other. The FMLs may be physically co-located in a data center or can be moved to any location in other data centers.

FMLs may also receive input from third party servers. Such inputs may, for example, include quality of service requirements, external data feeds and the location thereof, or other inputs that may be ingested into a VM or used by the FMLs to optimize the service offering for users.

In a use case, VMs that support autonomous or semi-autonomous vehicles may be moved to locations that correspond to the velocity and direction of the vehicle in order to reduce latency. Other 5G internet of things devices may also benefit from the use of the FMLs.

Operating Environment. With reference to FIG. 1, there is shown an exemplary system 10 in which the present disclosure may be implemented. The system 10 may include to a network 11 which may, for example, be an Internet Protocol/Multiprotocol Label Switching (IP/MPLS) converged network. The disclosure is applicable to any type of network 11, which may, for example, be an LTE or a 5G network. It will be understood by those skilled in the art that while the network 11 may comprise the afore-mentioned networks, a combination of one or more communication networks may be used.

Input devices represented by mobile user equipment 16 such as a smart phone, tablet, PDA or other portable user device in communication via a cellular or other wireless system, represented by cell tower 14, may also be used. The UE 16 may, for example, be a smartphone, tablet or personal computer configured with an operating system which may, for example, be one of Apple's iOS, Google's Android, Microsoft Windows Mobile, or any other smartphone operating system or computer operating system or versions thereof. The UE 16 may control user input functions, including, but not limited to, selection and control of inputs to system 10 and receipt of outputs from system 10. The UE 16 may provide the ability for a user to input billing information, profile information, emergency contacts, or other inputs that enable or personalize the functions available to a user. The UE 16 may include local client software for communication with external servers 182.

The UE 16 may have one or more applications residing thereon and be able to access other services within network 11 or from external servers 24. For example, network-based services may include VoLTE voice calls, SMS or MMS messaging, or other network-based services. Client applications on the UE 16 may access corresponding server applications residing on external servers 24 such as social media applications, live video or video-on-demand services, music services, gaming services and other services. The application functionality embedded and described in the disclosure may reside either on the UE 16, within the network 11, or external servers 24 or a combination thereof. Any such designation of functionality between the UE 16 and external servers 24 may be a design choice or based on user experience, performance, cost, or any other factor. The allocation of functionality is exemplary only and non-limiting in scope of the present disclosure.

To communicate with the network 11, the UE 16 may have a direct or indirect communication interface for a wireless or wired communication system, which may, for example, be Wi-Fi, Bluetooth®, 3G, 46 LTE, and 5G, Wi-Fi, LAN, WiLan or any other wireless communication system. For the purposes of this disclosure, communication between the UE 16 and network 11 would be through cellular towers 14.

In order to provide services to UE 16, resources within network 11 may be allocated to support such services. In an aspect, the network 11 will be a software defined network in which one or more VMs will be instantiated on hardware platforms within network 11. Such VMs may be allocated based on one or more criteria, including a geographic relationship with respect to UE 16, service level agreements, latency, priority, and any other criteria, Software defined networks are described in more detail below beginning with reference to FIG. 6.

Figure 2:
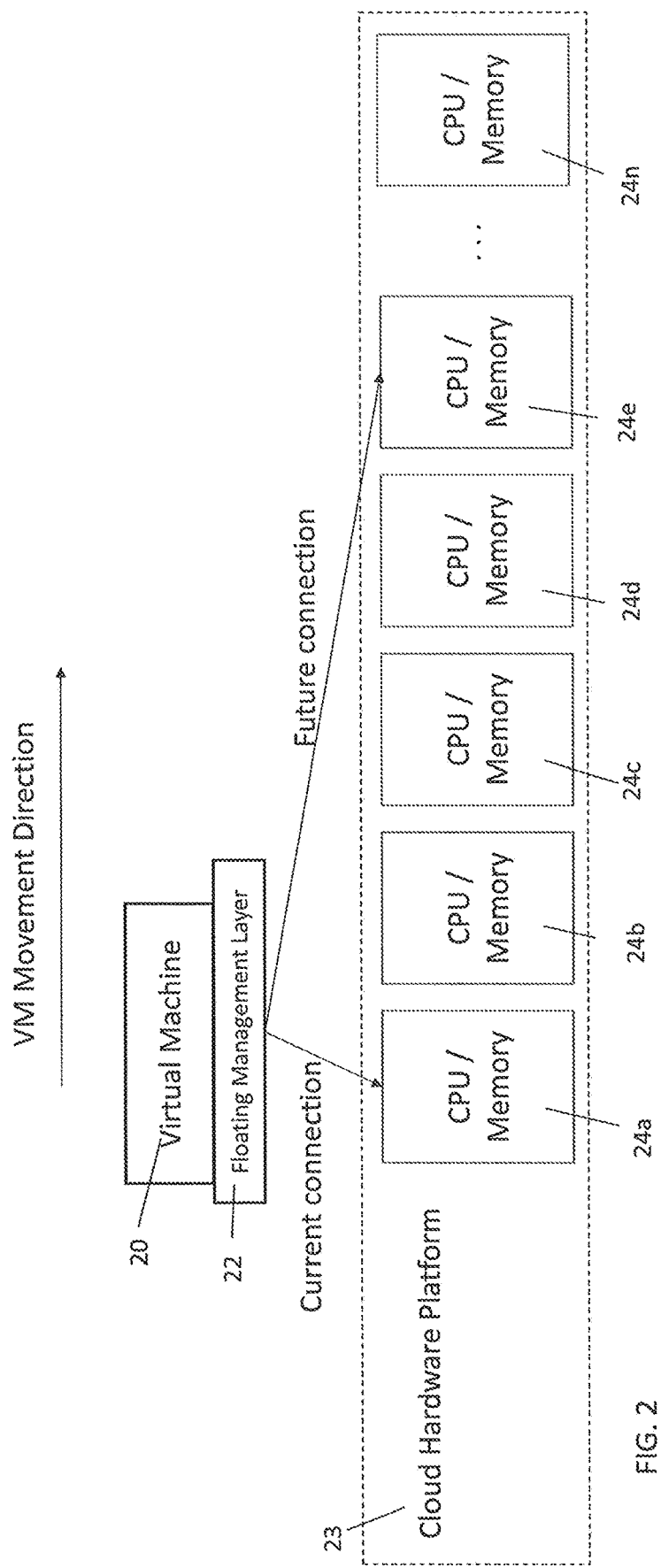
FIG. 2 illustrates an exemplary architecture for the system of the present disclosure.

With reference to FIG. 2, there is shown an exemplar configuration of a VM 20 having a floating management layer 22. There is also shown a hardware platform 23 which may, for example, be a cloud-based hardware platform. Individual hardware resources, designated as CPU/Memory 24a through 24n, are shown, which may form part of the cloud-based hardware platform 23 and may be located at different geographic areas. It will be understood that hardware resources 24a through 24n may also include network interfaces, multiple or shared CPUs and various types of memory and memory configurations. It will also be understood that some or more of hardware resources 24a through 24n may be geographically co-located and other of the hardware resources 24a through 24n may be geographically dispersed. It will also be understood that hardware resources 24a through 24n are not limited to any particular number of hardware resources. It will also be understood that while there is a one-to-one mapping of a VM 20 to a FML 22, there is no requirement for a one-to-one mapping of the combination of VM/FML to hardware resources 24a through 24n and there may, in fact be multiple VM/FML combinations mapped to the same hardware resource. Other hardware resources may go unused at any given time.

In this exemplary configuration of FIG. 2, VM 20 and FML 22 are bound to hardware resources 24a. As described in more detail below, upon the occurrence of a trigger event or in view of policies, the FML 22 may target another hardware resource, shown as hardware resource 24e, to which to move the VM 20. In an aspect, the FML 22 may determine that application, network, or system performance would improve if VM 20 was moved to hardware resource 24e. In that case, VM 20 would be copied to hardware resource 24e, including all of its operational components and interfaces, and once running on hardware resource 24e, then VM 20 deleted from hardware resource 24a. This may occur without terminating the VM 20 on hardware platform 24a first and then re-instantiating the VM 20 on hardware platform 24e and may maintain all data and interfaces.

Figure 3:
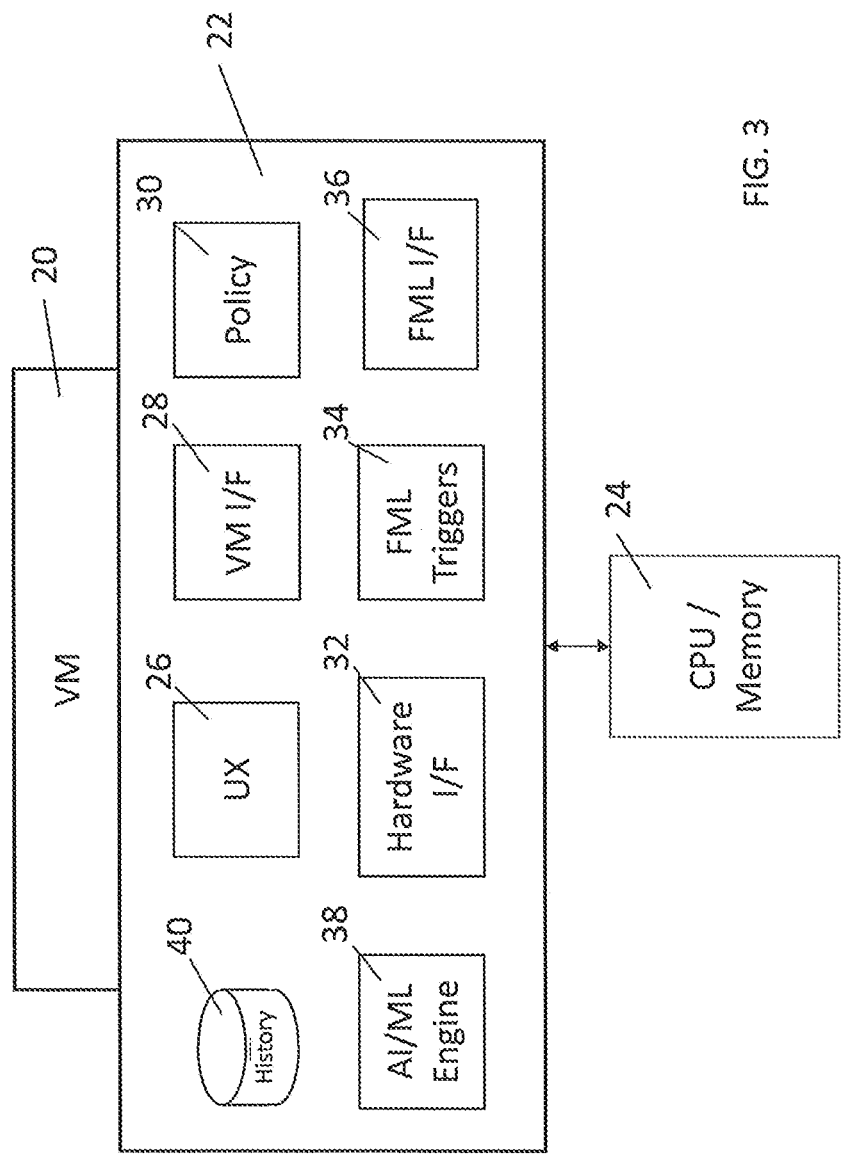
FIG. 3 illustrates an exemplary functional diagram of a floating management layer in accordance with the present disclosure.

FIG. 3 shows an exemplary functional block diagram of a floating management layer 22 attached to VM 20 and hardware platform 24. The VM 20 attaches through a VM interface 28 and the FML 22 attaches to hardware platform 24 through hardware interface 32. There is shown a user interface 26 through which an operator may define attributes of the VM 20. Policies (shown as policy 30) may be set and changed by an operator through the user interface 26. Additionally, FML triggers 34 may also be defined through the user interface 26. The user interface 26 may provide a dashboard into the operation and location of not only individual FMLs, but also a network of FMLs that the FML is in communication with. It will be understood that there may be other methods of setting policies and triggers other than through the user interface 26, and some may be self-configurable, and others may be set and updated through interaction with other FMLs through FML interface 36.

FML triggers 34 may include VM interfaces and the location of other VMs which VM 20 is interacting. Other FML triggers 34 may include heating of current resources, load balancing usage across the platform, hardware faults, delay or latency considerations, operating efficiencies, maintenance considerations, power consumption or conservation, or other operational or maintenance considerations. Environmental conditions, such as humidity in a region, electromagnetic interference, and other environmental factors may be used as triggers. The FML may trigger a move to cluster, or temporarily consolidate active VMs into one geographical area during low utilization to conserve electrical consumption. In an aspect, FMLs may move VMs to geographic locales where energy rates are less expensive during certain periods of the week or certain times of the day. FML triggers 34 may also include a detected hardware attack or breach, in which the FML may move the VM 20 to another hardware resource.

The FML 22 is tasked with keeping VM 20 resources bound to hardware platform 24 at any given time and prepares the next set of hardware resources 24a to 24n to be bound with the VM 20 based on the next move.

Figure 4:
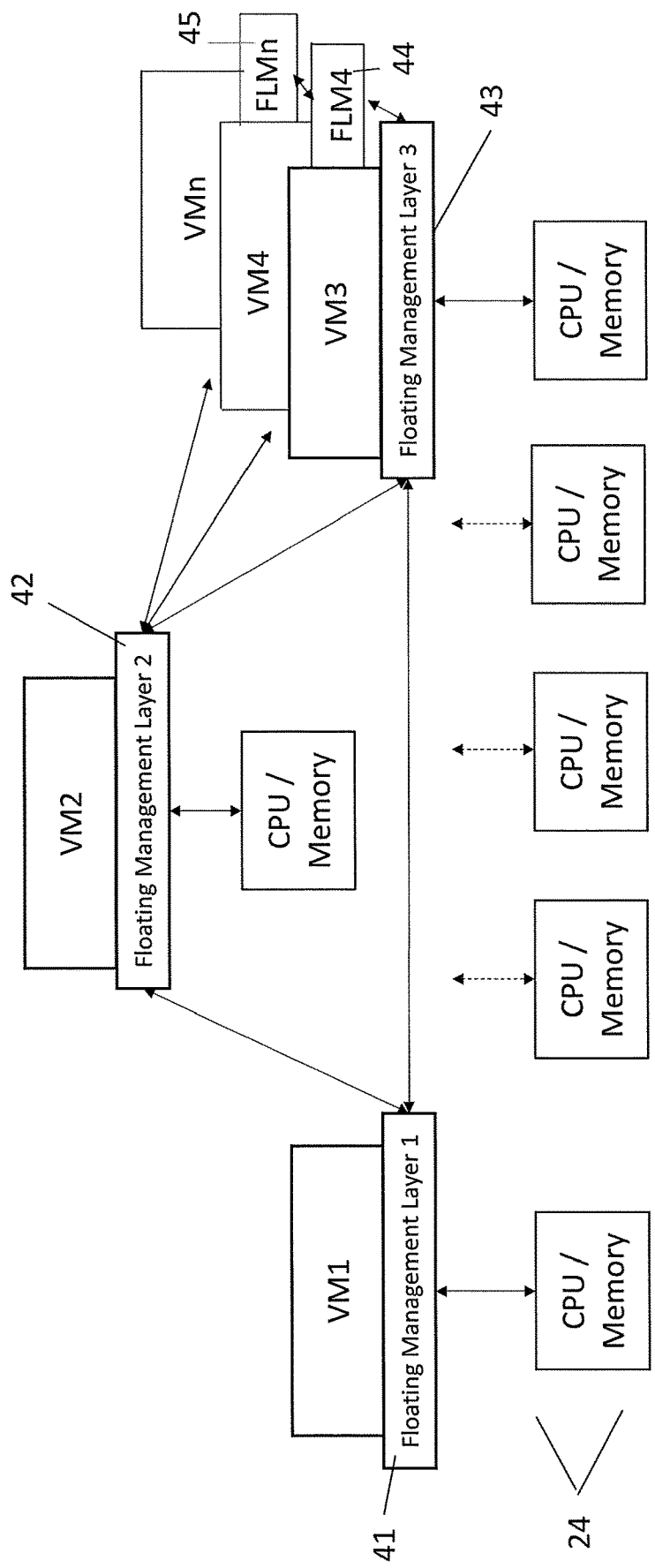
FIG. 4 illustrates an exemplary functional diagram of the interaction of multiple floating management layers in accordance with the present disclosure.

FIG. 4. Shows a plurality of floating management layers, including floating management layer 1 41, FML2 42, FML3 43, FLM4 44 and FMn 45, each of the FMLs attached to VM1, VM2, VM3, VM4 and VMn, respectively. Each FML is in communication with one or more other FMLs and as such, each FML may be aware of the geographical span of the HW platforms 24.

The FML 22 monitors one or more connections of VM 20 connections to the VMs. FML 22 may periodically check the optimum geographical location of the hardware platform 24 for the VM 20 to be installed to improve service or performance. The FML 22 may send short probing packets to one or more destinations of other VMs connected to VM 20. In an aspect, the FML 22 may measure round trip times to determine delay or latency and then decide whether to move VM 20 to alternative hardware resources 24 and if so, to which of those hardware resources 24.

If the VM needs to connect to distant resources or other VMs which are far from where the VM resides, then the FML will compare the enhancement to performance if the VM is moved nearer to those new resources to the performance in its current location. If FLM 22 makes the decision to move VM 20 to a new hardware platform 24, FLM 22 will spin up the same VM 20 on the selected new target hardware platform and thereafter migrates the traffic to the new hardware platform. FLM 22 will eventually disable and remove the original VM 20 from the previous hardware platform. The FML 22 may then sends route updates to gateways and neighboring nodes to maintain continuity of performance of the network and the individual VMs running in the network.

Each FML may maintain a log as to the physical locations occupied and HW resources accessed over the life span of the VM 20. This log may be stored in history database 40 and accessed at a later time for use by the artificial intelligence/machine learning engine 38 described in more detail below.

Methods of Use.

At spin-up, the VM may be initially installed on a certain segment on the hardware platform without having hard assignment to the hardware resources, specifically, CPU, memory, and network interfaces. The FML associated with the VM will be instantiated and attached to the VM at that time. The FML may initially bind the VM to the nearest hardware resource and then commence communication with other FMLs while the VM begins operations.

Figure 5:
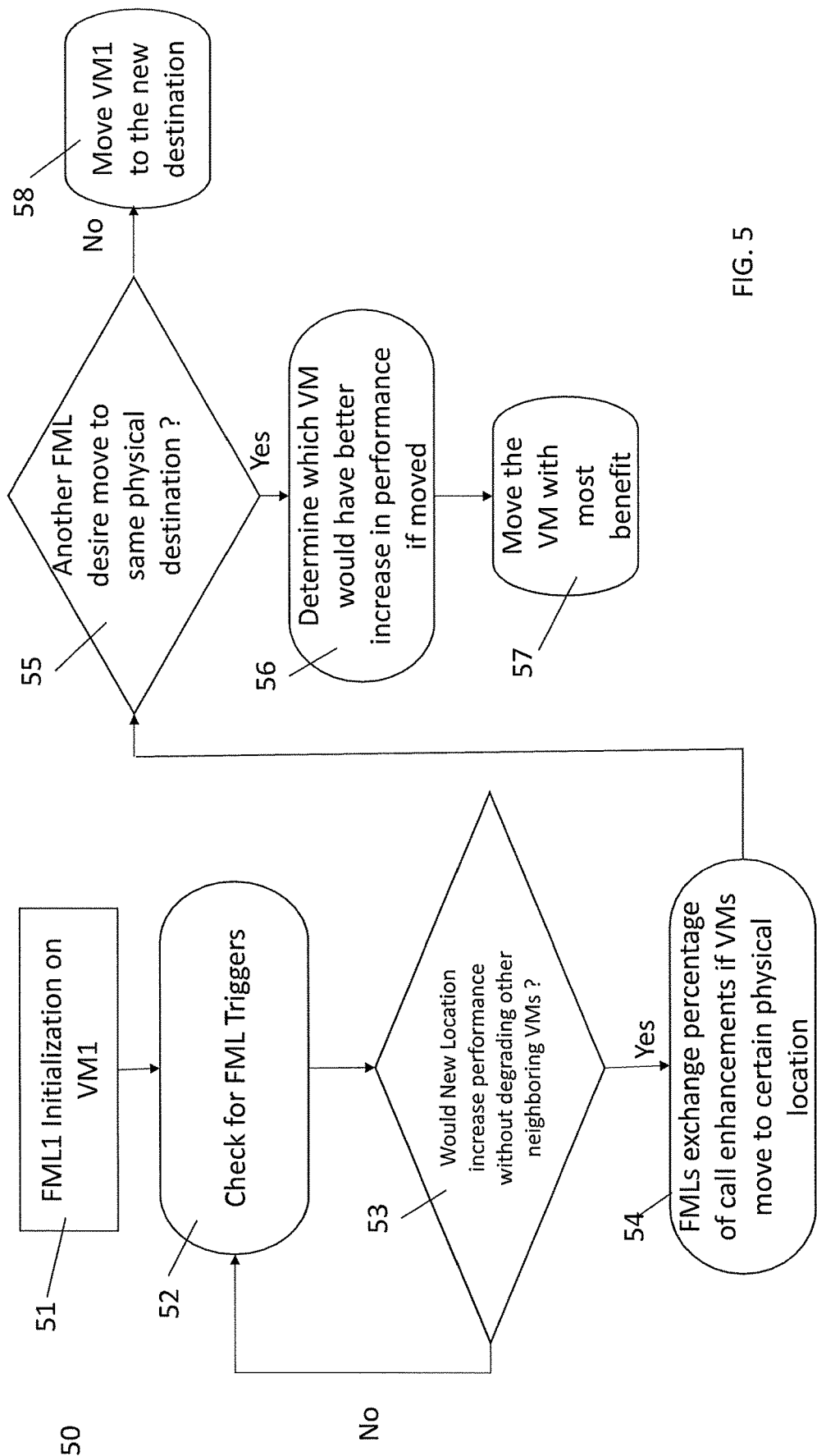
FIG. 5 illustrates an exemplary flow diagram showing the movement of a virtual machine using a floating management layer in accordance with the present disclosure.

With reference to FIG. 5, there is shown a high-level exemplary method 50 in accordance with the present invention. At 52, FML1 initializes and attaches to VM 1. At 52, FML1 monitors for FML triggers. If a trigger is detected at 52, the FML may test a proposed new hardware platform at a different logical or physical location to determine whether the performance would be improved without degradation of the performance of other neighboring VMS. If is determined that the performance would not be increased or the move would degrade the performance of other VMs at 53, then the FML will not move the VM to a new location and the method reverts to 52 where the FML will continue monitoring for FML triggers.

If the determination is to move the VM to the new location, a second inquiry may be performed. At 54, one or more FMLs will exchange anticipated performance enhancements if the attached virtual machines move to a designated physical location. As part of the coordination among a plurality of FMLs, at 55 it is determined whether another FML wants to move its attached VM to the same physical location. If not, then FML1 will move VM1 to the new hardware destination. However, if the coordination step determines that a second FML desires to move its attached VM to the same hardware destination, then the FMLs will coordinate to determine which VM would benefit the most from the move to the new hardware destination at 56. At 57, the VM with the most to gain by the move will be moved to the new hardware destination.

The disclosure may include improved methods through the use of the artificial intelligence or machine learning algorithms. For example, the logic and policy rules of the diagnostic system algorithms may be programed and then initially trained with a data set and once operational, the algorithms become more efficient and accurate as the algorithm processes additional data sets. The algorithms may be any type of suitable machine learning algorithm such as linear or multivariable regression analytics. Because the systems operate in a cloud environment and may use software defined networking, the systems are inherently scalable.

In view of the foregoing, the present disclosure provides a practical application and enhances the state of the technology for network cloud computing. The disclosure promotes zero-touch automation by isolating network cloud faults without human intervention, improves network cloud diagnosis mechanism with self-learning, self-growing, and self-serve capabilities, updates operations with real-time status upon a network outage or service interruption event, embeds a knowledge base into the network cloud platform, and increases network cloud assurance productivity with reduce maintenance cost.

Artificial Intelligence/Machine Learning. With assistance of a machine learning engine 38, it is possible to improve the performance of FMLs across the entire network using historical data along with real time monitoring and triggering. Such historical data may, for example, be stored in historical data base 40. The historical data base 22, may for example, include the historical record of previous moves of VMs to hardware resources, performance measurements before and after such moves, loading and environmental conditions at the time, and any other factors that may affect the performance of VMs running on the network. An AI/ML algorithm executing in AI/ML engine 38 may use the historical data that correlates historical data to performance enhancements to predict optimized binding of VMs to hardware resources at any given time and under different operating conditions. The historical data may be weighted by the AI/ML algorithm such that older data is weighed less than more recent data.

Figure 6:
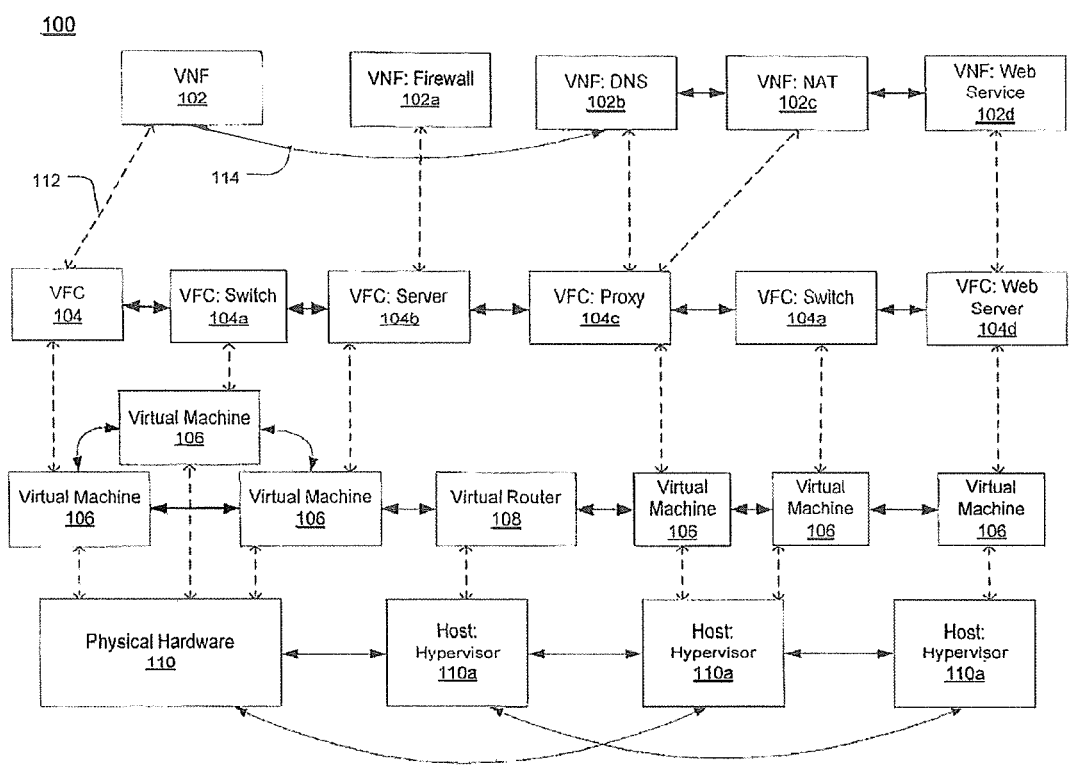
FIG. 6 is a representation of an exemplary software defined network.

Software Defined Network Detailed Description. FIG. 6 is a representation of an exemplary network 100. Network 100 may comprise a Software Defined Network (SDN)—that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions.

Virtual network functions (VNFs) 102 may be able to support a limited number of sessions. Each VNF 102 may have a VNF type that indicates its functionality or role. For example, FIG. 6 illustrates a gateway VNF 102*a* and a policy and charging rules function (PCRF) VNF 102*b*. Additionally or alternatively, VNFs 102 may include other types of VNFs. Each VNF 102 may use one or more virtual machines (VMs) 106 to operate. Each VM 106 may have a VM type that indicates its functionality or role. For example, FIG. 6 illustrates multiple VMs 106 that may include MCM VM, an ASM VM, and a DEP VM. Additionally, or alternatively, VMs 106 may include other types of VMs. Each VM 106 may consume various network resources from a server 112, such as a resource 108, a virtual central processing unit (vCPU) 108*a*, memory 108*b*, or a network interface card (NIC) 108*c* in FIG. 7. Additionally, or alternatively, server 112 may include other types of resources 108.

Figure 7:
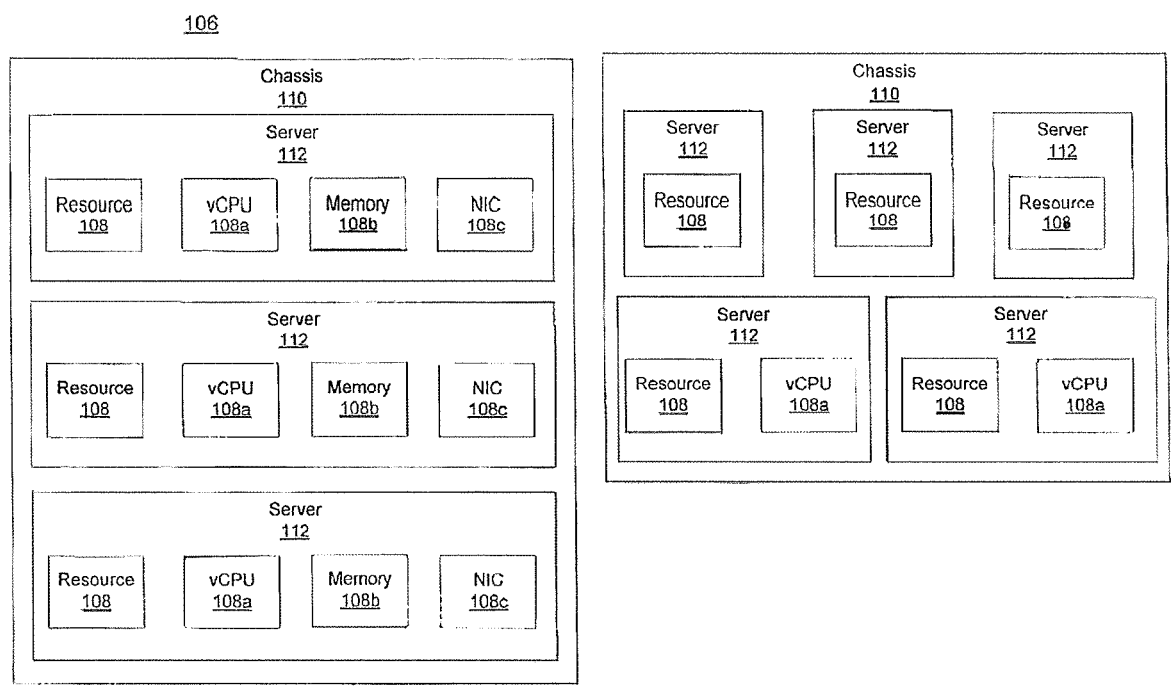
FIG. 7 is a representation of an exemplary hardware platform for a network.

While FIG. 6 illustrates resources collectively contained in hardware platform 911, the configuration of hardware platform 911 may isolate, for example, certain memory 108*b* from other memory 108*b* FIG. 7 provides an exemplary implementation of hardware platform 910.

Hardware platform 911 may comprise one or more chasses 110. Chassis 110 may refer to the physical housing or platform for multiple servers 112 or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally, or alternatively, chasses 110 may be communicatively coupled together (not shown) in any combination or arrangement.

The characteristics of each chassis 110 and each server 112 may differ. For example, FIG. 7 illustrates that the number of servers 112 within two chasses 110 may vary. Additionally, or alternatively, the type or number of resources 108 within each server 112 may vary. In an aspect, chassis 110 may be used to group servers 112 with the same resource characteristics. In another aspect, servers 112 within the same chassis 110 may have different resource characteristics.

Given hardware platform 911, the number of sessions that may be instantiated may vary depending upon how efficiently resources 108 are assigned to different VMs 106. For example, assignment of VMs 106 to particular resources 108 may be constrained by one or more rules. For example, a first rule may require that resources 108 assigned to a particular VM 106 be on the same server 112 or set of servers 112. For example, if VM 106 uses eight vCPUs 108a, 1 GB of memory 108b, and 2 NICs 108c, the rules may require that all of these resources 108 be sourced from the same server 112. Additionally, or alternatively, VM 106 may require splitting resources 108 among multiple servers 112, but such splitting may need to conform with certain restrictions. For example, resources 108 for VM 106 may be able to be split between two servers 112. Default rules may apply. For example, a default rule may require that all resources 108 for a given VM 106 must come from the same server 112.

An affinity rule may restrict assignment of resources 108 for a particular VM 106 (or a particular type of VM 106). For example, an affinity rule may require that certain VMs 106 be instantiated on (that is, consume resources from) the same server 112 or chassis 110. For example, if VNF 102 uses six MCM VMs 106, an affinity rule may dictate that those six MCM VMs 106 be instantiated on the same server 112 (or chassis 110). As another example, if VNF 102 uses MCM VMs 106, ASM VMs 106, and a third type of VMs 106, an affinity rule may dictate that at least the MCM VMs 106 and the ASM VMs 1046 be instantiated on the same server 112 (or chassis 110). Affinity rules may restrict assignment of resources 108 based on the identity or type of resource 108, VNF 102, VM 106, chassis 110, server 112, or any combination thereof.

An anti-affinity rule may restrict assignment of resources 108 for a particular VM 106 (or a particular type of VM 106). In contrast to an affinity rule—which may require that certain VMs 106 be instantiated on the same server 112 or chassis 110—an anti-affinity rule requires that certain VMs 106 be instantiated on different servers 112 (or different chasses 110). For example, an anti-affinity rule may require that MCM VM 106 be instantiated on a particular server 112 that does not contain any ASM VMs 106. As another example, an anti-affinity rule may require that MCM VMs 106 for a first VNF 102 be instantiated on a different server 112 (or chassis 110) than MCM VMs 106 for a second VNF 102. Anti-affinity rules may restrict assignment of resources 108 based on the identity or type of resource 108, VNF 102, VM 106, chassis 110, server 112, or any combination thereof.

Within these constraints, resources 108 of servers 112 may be assigned to be used to instantiate VMs 106, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular server 112.

For example, consider a session that may require gateway VNF 102a and PCRF VNF 102b. Gateway VNF 102a may require five VMs 106 instantiated on the same server 112, and PCRF VNF 102b may require two VMs 104 instantiated on the same server 112. (Assume, for this example, that no affinity or anti-affinity rules restrict whether VMs 106 for PCRF VNF 102b may or must be instantiated on the same or different server 112 than VMs 106 for gateway VNF 102a.) In this example, each of two servers 112 may have sufficient resources 108 to support 10 VMs 106. To implement sessions using these two servers 112, first server 112 may be instantiated with 10 VMs 106 to support two instantiations of gateway VNF 102a, and second server 112 may be instantiated with 9 VMs: five VMs 106 to support one instantiation of gateway VNF 102a and four VMs 106 to support two instantiations of PCRF VNF 102b. This may leave the remaining resources 108 that could have supported the tenth VM 108 on second server 112 unused (and unusable for an instantiation of either a gateway VNF 102a or a PCRF VNF 102b). Alternatively, first server 112 may be instantiated with 10 VMs 106 for two instantiations of gateway VNF 102a and second server 112 may be instantiated with 10 VMs 106 for five instantiations of PCRF VNF 102b, using all available resources 108 to maximize the number of VMs 106 instantiated.

Consider, further, how many sessions each gateway VNF 102a and each PCRF VNF 102b may support. This may factor into which assignment of resources 108 is more efficient. For example, consider if each gateway VNF 102a supports two million sessions, and if each PCRF VNF 102b supports three million sessions. For the first configuration—three total gateway VNFs 102a (which satisfy the gateway requirement for six million sessions) and two total PCRF VNFs 102b (which satisfy the PCRF requirement for six million sessions)—would support a total of six million sessions. For the second configuration—two total gateway VNFs 102a (which satisfy the gateway requirement for four million sessions) and five total PCRF VNFs 102b (which satisfy the PCRF requirement for 15 million sessions)—would support a total of four million sessions. Thus, while the first configuration may seem less efficient looking only at the number of available resources 108 used (as resources 108 for the tenth possible VM 106 are unused), the second configuration is actually more efficient from the perspective of being the configuration that can support the greater number of sessions.

To solve the problem of determining a capacity (or, number of sessions) that can be supported by a given hardware platform 911, a given requirement for VNFs 102 to support a session, a capacity for the number of sessions each VNF 102 (e.g., of a certain type) can support, a given requirement for VMs 106 for each VNF 102 (e.g., of a certain type), a given requirement for resources 108 to support each VM 106 (e.g., of a certain type), rules dictating the assignment of resources 108 to one or more VMs 106 (e.g., affinity and anti-affinity rules), the chasses 110 and servers 112 of hardware platform 911, and the individual resources 108 of each chassis 110 or server 112 (e.g., of a certain type), an integer programming problem may be formulated.

First, a plurality of index sets may be established. For example, index set L may include the set of chasses 110. For example, if a system allows up to 6 chasses 110, this set may be:

$$L=\{1,2,3,4,5,6\},$$

where 1 is an element of L.

Another index set J may include the set of servers 112. For example, if a system allows up to 16 servers 112 per chassis 110, this set may be:

$$J=\{1,2,3,\ldots,16\},$$

where j is an element of J

As another example, index set K having at least one element k may include the set of VNFs 102 that may be considered. For example, this index set may include all types of VNFs 102 that may be used to instantiate a service. For example, let $$K=\{GW,PCRF\}$$

where GW represents gateway VNFs 102a and PCRF represents PCRF VNFs 102b.

Another index set I(k) may equal the set of VMs 106 for a VNF 102k. Thus, let $$I(GW)=\{MCM,ASM,IOM,WSM,CCM,DCM\}$$

represent VMs 106 for gateway VNF 102a, where MCM represents MCM VM 106, ASM represents ASM VM 106, and each of IOM, WSM, CCM, and DCM represents a respective type of VM 106. Further, let $$I(PCRF)=\{DEP,DIR,POL,SES,MAN\}$$

represent VMs 106 for PCRF VNF 102b, where DEP represents DEP VM 106 and each of DIR, POL, SES, and MAN represent a respective type of VM 106.

Another index set V may include the set of possible instances of a given VM 104. For example, if a system allows up to 20 instances of VMs 106, this set may be:

$$V=\{1,2,3,\ldots,20\},$$

where v is an element of V.

In addition to the sets, the integer programming problem may include additional data. The characteristics of VNFs 102, VMs 106, chasses 110, or servers 112 may be factored into the problem. This data may be referred to as parameters. For example, for given VNF 102k, the number of sessions that VNF 102k can support may be defined as a function S(k). In an aspect, for an element k of set K, this parameter may be represented by $S(k)>=0$; as a measurement of the number of sessions k can support. Returning to the earlier example where gateway VNF 102a may support 2 million sessions, then this parameter may be $S(GW)=2,000,000$.

VM 106 modularity may be another parameter in the integer programming problem. VM 106 modularity may represent the VM 106 requirement for a type of VNF 102. For example, for k that is an element of set K and i that is an element of set I, each instance of VNF k may require M(k, i) instances of VMs 106. For example, recall the example where $$I(GW)=\{MCM,ASM,IOM,WSM,CCM,DCM\}.$$

In an example, M(GW, I(GW)) may be the set that indicates the number of each type of VM 106 that may be required to instantiate gateway VNF 102a. For example, $$M(GW,I(GW))=\{2,16,4,4,2,4\}$$

may indicate that one instantiation of gateway VNF 102a may require two instantiations of MCM VMs 106, 16 instantiations of ACM VM 106, four instantiations of IOM VM 106, four instantiations of WSM VM 106, two instantiations of CCM VM 106, and four instantiations of DCM VM 106.

Another parameter may indicate the capacity of hardware platform 910. For example, a parameter C may indicate the number of vCPUs 108a required for each VM 106 type i and for each VNF 102 type k. For example, this may include the parameter C(k, i).

For example, if MCM VM 106 for gateway VNF 102a requires 20 vCPUs 108a, this may be represented as $$C(GW,MCM)=20.$$

However, given the complexity of the integer programming problem—the numerous variables and restrictions that must be satisfied—implementing an algorithm that may be used to solve the integer programming problem efficiently, without sacrificing optimality, may be difficult.

Figure 8:
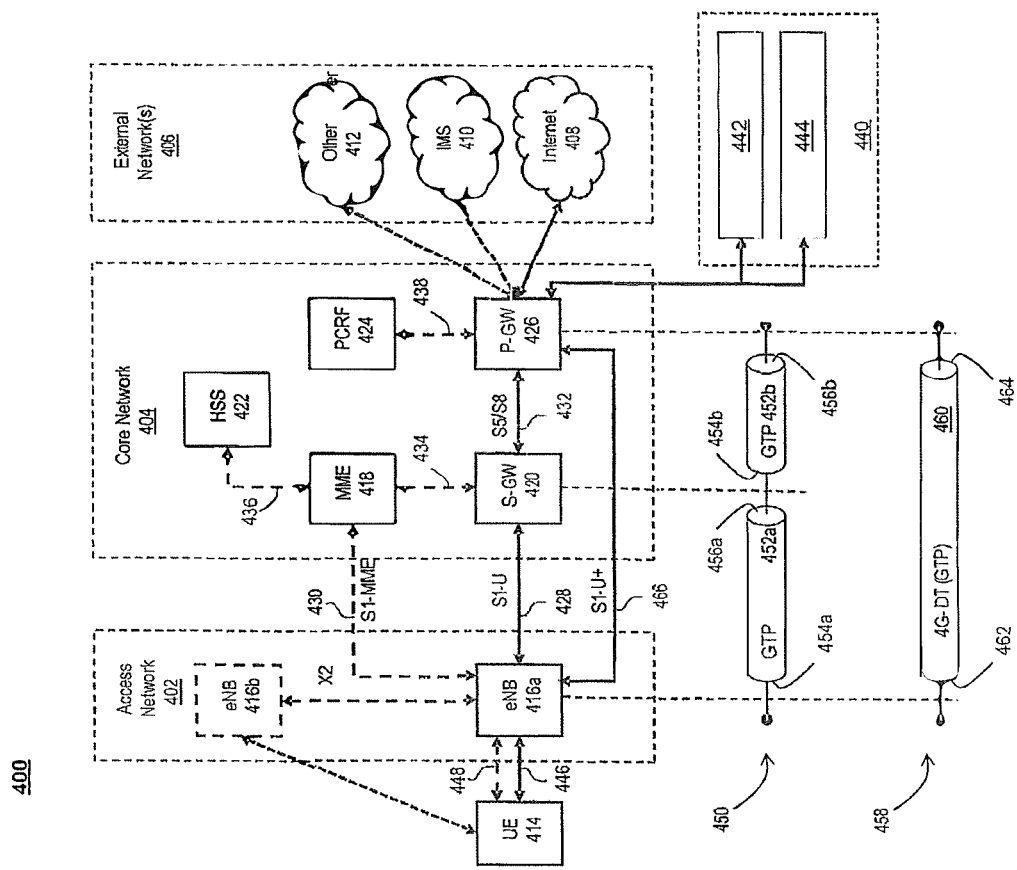
FIG. 8 is an illustration of a functional block diagram depicting one example of a Long-Term Evolution-Evolved Packet System (LTE-EPS) network architecture.

FIG. 8 illustrates a functional block diagram depicting one example of an LTE-EPS network architecture 400 that may be at least partially implemented as an SDN. Network architecture 400 disclosed herein is referred to as a modified Long-Term Evolution/Evolved Packet System (LTE-EPS) architecture 400 to distinguish it from a traditional LTE-EPS architecture.

An example modified LTE-EPS architecture 400 is based at least in part on standards developed by the 3rd Generation Partnership Project (3GPP), with information available at www.3spp.org. LTE-EPS network architecture 400 may include an access network 402, a core network 404, e.g., an Evolved Packet Core (EPC) or Common BackBone (CBB) and one or more external networks 406, sometimes referred to as Packet Data Network (PDN) or peer entities. Different external networks 406 can be distinguished from each other by a respective network identifier, e.g., a label according to Domain Name Server (DNS) naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 406 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as User Equipment (UE) 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, Voice over IP (VoIP), streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers (virtual connections between UEs and Packet Gateways, PGWs), to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as Voice Over IP (VoIP); and (ii) non-guaranteed bit rate bearers that do not require guarantee bit rate, e.g., for applications, such as web browsing.

In one embodiment, the core network 404 includes various network entities, such as Mobility Management Entity (MME) 418, Serving Gateway (SGW) 420, Home Subscriber Server (HSS) 422, Policy and Charging Rules Function (PCRF) 424 and Packet Data Network Gateway (PGW) 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively, or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The "Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Currently Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 8. In other words, either or both of access network 402 and the core network 404 can include additional network elements that are not shown, such as various routers, switches and controllers. In addition, although FIG. 8 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 8. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between evolved Node B (eNodeB, eNB) 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the General Packet Radio Service (GPRS) Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each Packet Data Protocol (PDP) context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface 466, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 9:
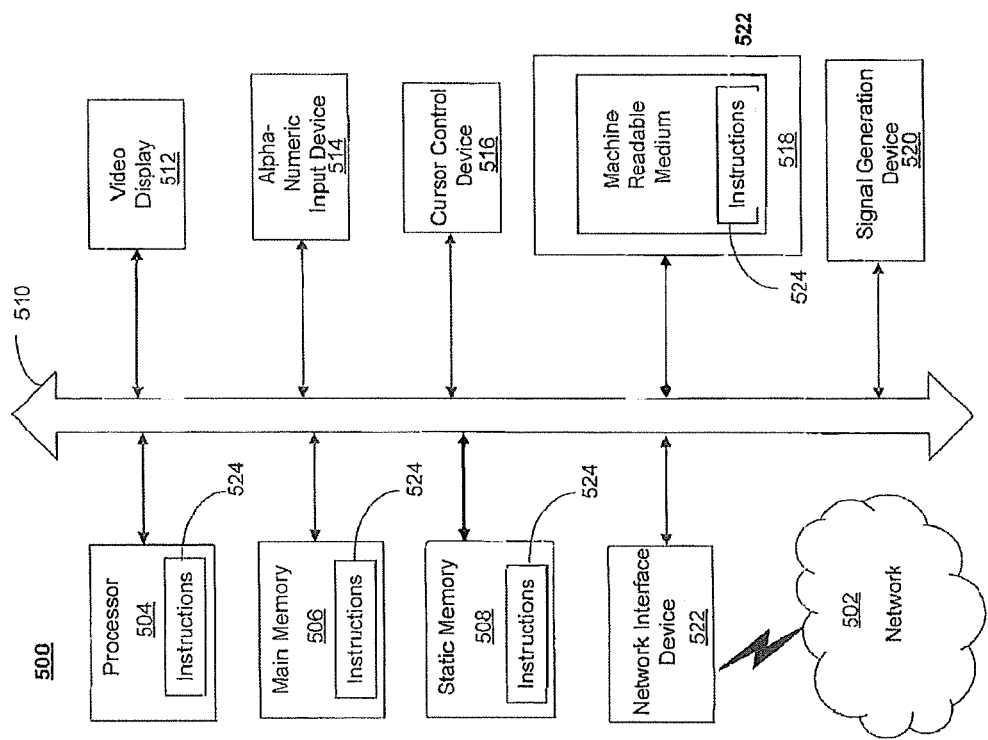
FIG. 9 depicts an exemplary diagrammatic representation of a machine in the form of a computer system.

FIG. 9 depicts an exemplary diagrammatic representation of a machine in the form of a computer system 500 within which a set of instructions, when executed, may cause the machine to perform any one or more of the methods described above. One or more instances of the machine can operate, for example, as processor 504 for UE 414, eNB 416, MME 418, SGW 420, HSS 422, PCRF 424, PGW 426 and other devices. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 518 having instructions 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 10:
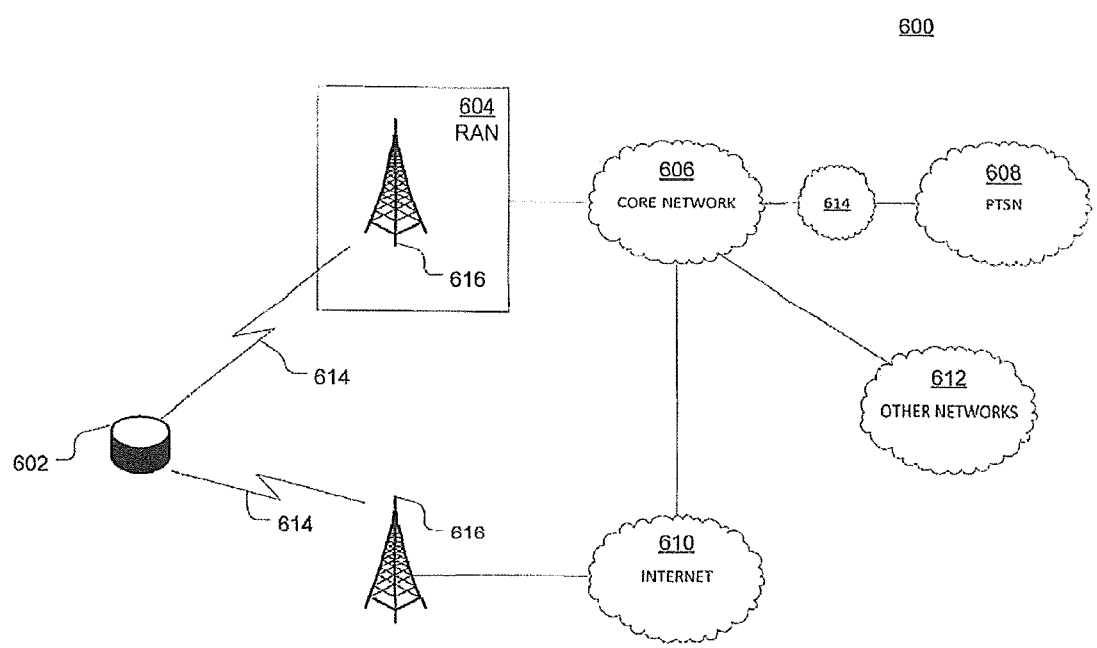
FIG. 10 illustrates a base station with a direct connection to Internet.

As shown in FIG. 10, telecommunication system 600 may include wireless transmit/receive units (WTRUs) 602, a Radio Access Network (RAN) 604, a core network 606, a public switched telephone network (PSTN) 608, the Internet 610, or other networks 612, though it will be appreciated that the disclosed examples contemplate any number of Wireless Transmit/Receive Units (WTRUs), base stations, networks, or network elements. Each WTRU 602 may be any type of device configured to operate or communicate in a wireless environment. For example, a WTRU may comprise a mobile device, network device or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., radio frequency (RF), microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as Code Division Multiple Access (CDMA), Time-Division Multiple Access (TDMA), Frequency Division Multiple Access (FDMA), Orthogonal FDMA (OFDMA), Single-Carrier FDMA (SC-FDMA), or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 802.16 (i.e., Worldwide Interoperability for Microwave Access (WiMAX)), CDMA2000, CDMA2000 1x, CDMA2000 Evolution-Data Optimized (EV-DO), Interim Standard 2000 (IS-2000), Interim Standard 95 (IS-95), Interim Standard 856 (IS-856), GSM, Enhanced Data rates for GSM Evolution (EDGE), Global System for Mobile Communication (GSM) EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 802.11 to establish a wireless local area network (WLAN). As another example, base station 616 and associated WTRUs 602 may implement a radio technology such as IEEE 802.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 10, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 10, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 606 to provide access to PSTN 608. Internet 610 may include a global system of interconnected computer networks or devices that use common communication protocols, such as the transmission control protocol (TCP), user datagram protocol (UDP), or Internet Protocol (IP) in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 11:
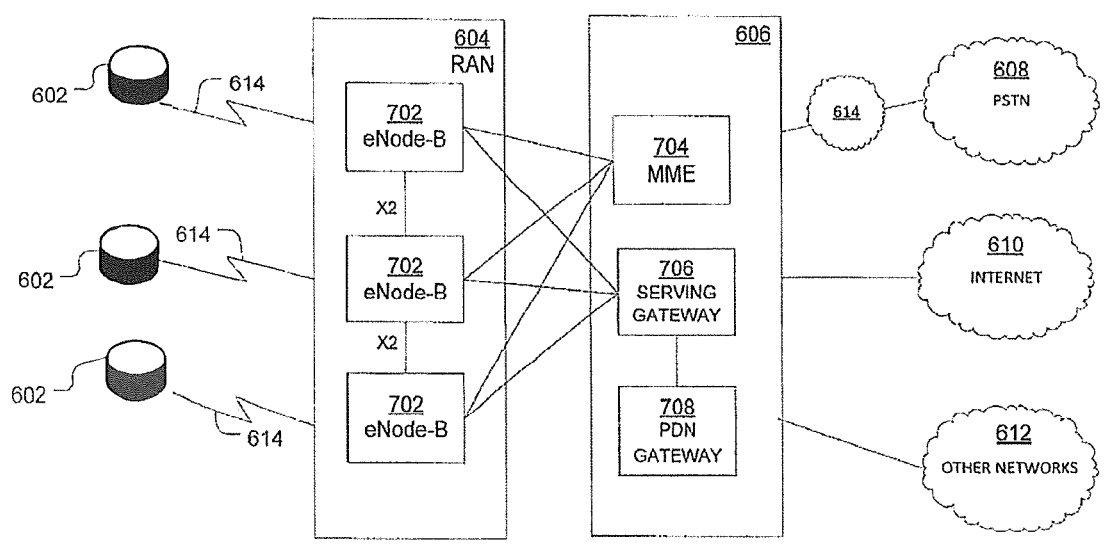
FIG. 11 is an example system including RAN and core network.

FIG. 11 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 11 eNode-Bs 702 may communicate with one another over an X2 interface.

Core network 606 shown in FIG. 11 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or Wideband CDMA (WCDMA).

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 606 to facilitate communications between WTRUs 602 and traditional landline communications devices. In addition, core network 606 may provide the WTRUs 602 with access to other networks 612, which may include other wired or wireless networks that are owned or operated by other service providers.

Figure 12:
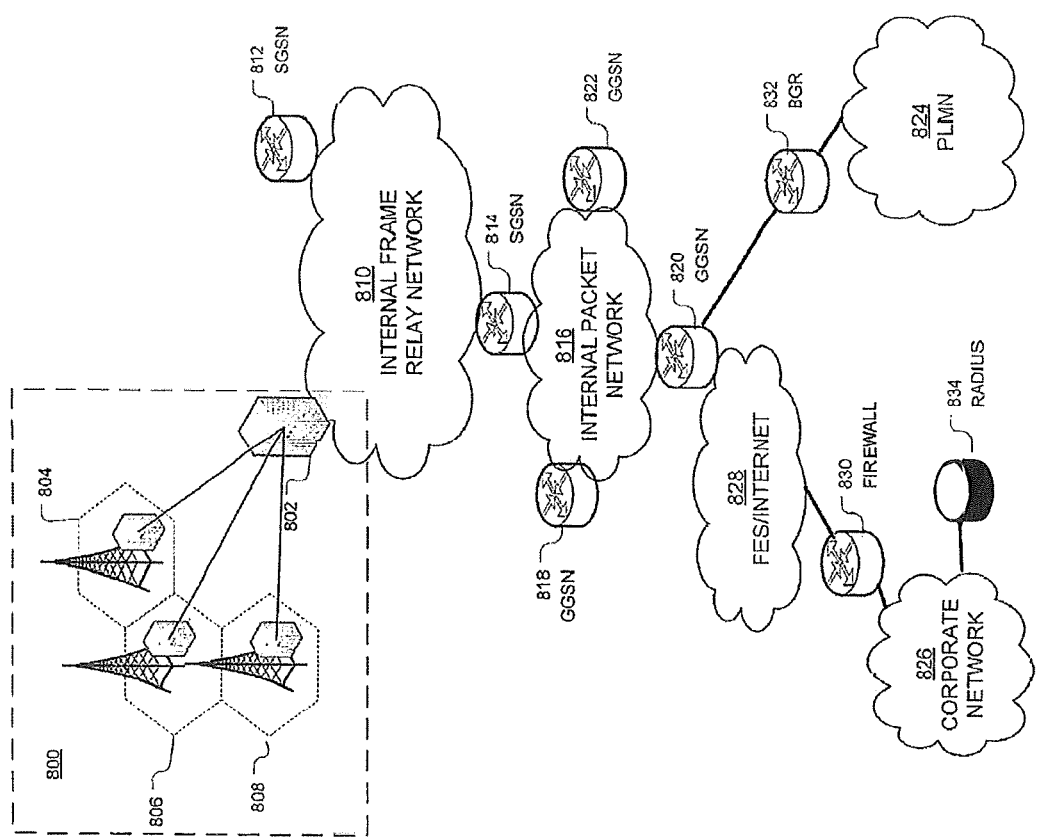
FIG. 12 illustrates an overall block diagram of an example packet-based mobile cellular network environment.

FIG. 12 depicts an overall block diagram of an example packet-based mobile cellular network environment, such as a GPRS network as described herein. In the example packet-based mobile cellular network environment shown in FIG. 12, there are a plurality of base station subsystems (BSS) 800 (only one is shown), each of which comprises a base station controller (BSC) 802 serving a plurality of Baseband Transceiver Stations (BTSs), such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a Serving GPRS Support Node (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as Public Land Mobile Network (PLMN) 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 13:
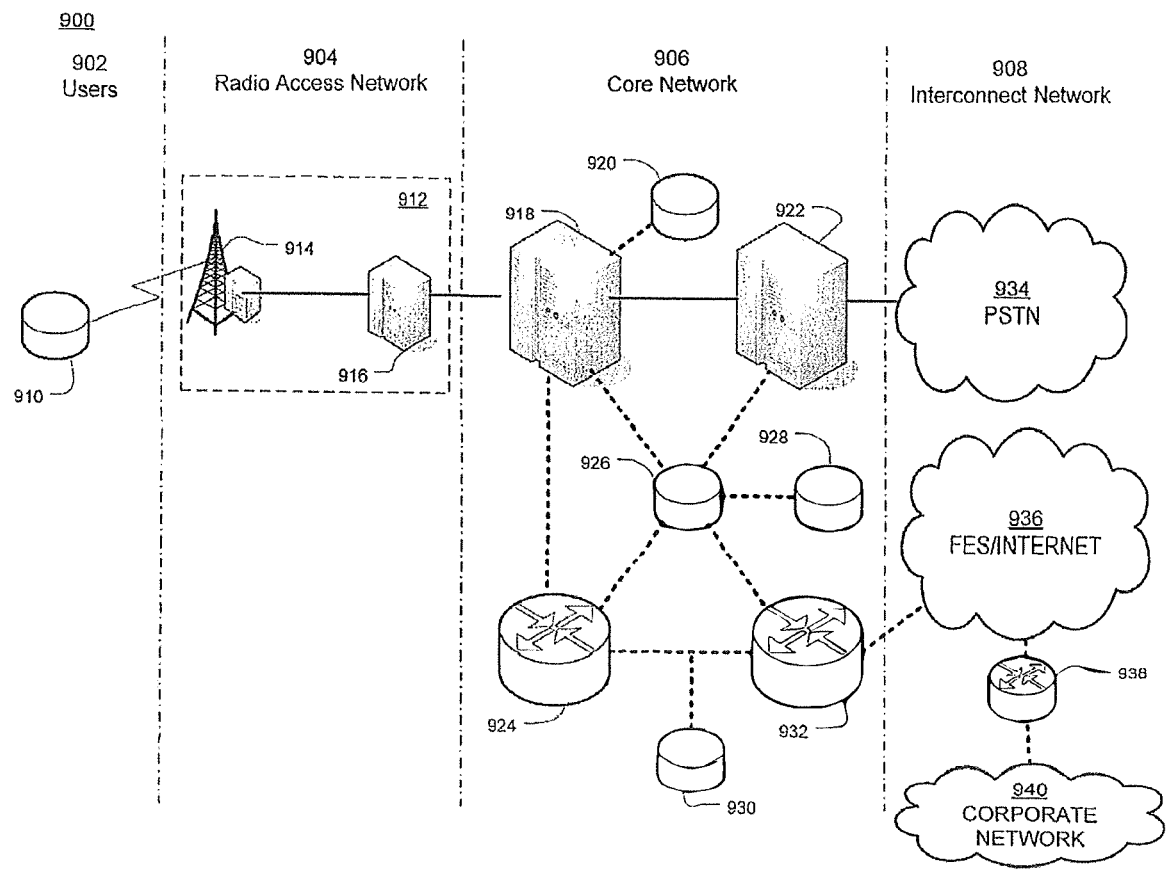
FIG. 13 illustrates an architecture of a typical General Packet Radio Service (GPRS) network.

FIG. 13 illustrates an architecture of a typical GPRS network 900 as described herein. The architecture depicted in FIG. 13 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 13. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 13, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 13, interconnect network 908 comprises a PSTN 934, an FES/Internet 936, firewall 938, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

Home Location Register (HLR) 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 13, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 938, to reach corporate network 940.

Figure 14:
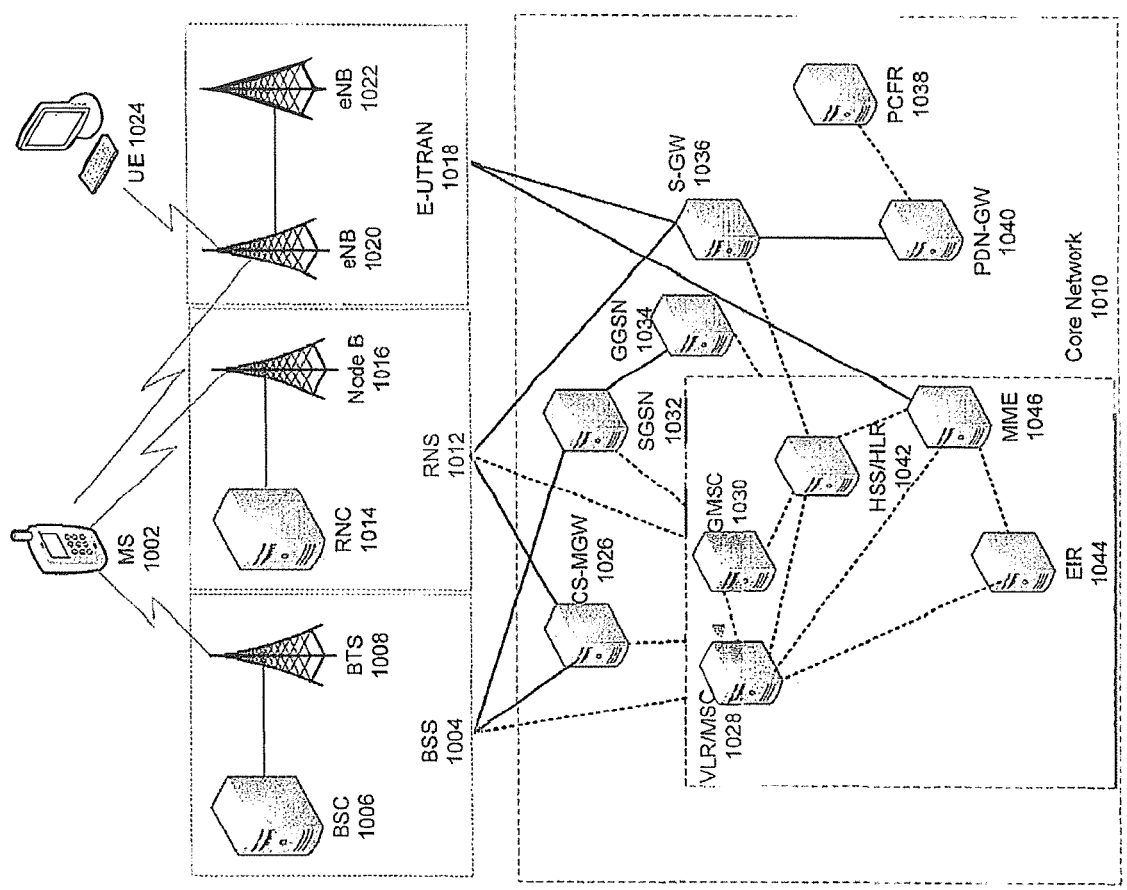
FIG. 14 illustrates a Public Land Mobile Network (PLMN) block diagram view of an example architecture that may be replaced by a telecommunications system.

FIG. 14 illustrates a PLMN block diagram view of an example architecture that may be replaced by a telecommunications system. In FIG. 14, solid lines may represent user traffic signals, and dashed lines may represent support signaling. MS 1002 is the physical equipment used by the PLMN subscriber. For example, network device or the like may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched Media Gateway (MGW) function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS/HLR 1042 is a database for user information and stores subscription data regarding MS 1002 or UE 1024 for handling calls or data sessions. Networks may contain one HSS/HLR 1042 or more if additional resources are required. Example data stored by HSS 1042 include, but is not limited to, user identification, numbering or addressing information, security information, or location information. HSS/HLR 1042 may also provide call or session establishment procedures in both the PS and CS domains.

VLR/MSC Server 1028 provides user location functionality. When MS 1002 enters a new network location, it begins a registration procedure. An MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. Gateway Mobile Services Switching Center (GMSC) server 1030 may serve as a connection to alternate GMSC servers for other MSs in larger networks.

Equipment Identity Register (EIR) 1044 is a logical element which may store the IMEI for MS 1002. User equipment may be classified as either "white listed" or "black-listed" depending on its status in the network. If MS 1002 is stolen and put to use by an unauthorized user, it may be registered as "black-listed" in EIR 1044, preventing its use on the network. An MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and an internet protocol are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple Machine-to-Machine (M2M) and Internet of Things (IoT) sensors/devices—through enhanced wireless management.

A 5G network may be overlaid on a 4G LTE network. While the 5G network uses similar functional components as a 4G network, 5G is more aggressive in pushing computational resources to the edge of the networks, including instantiating such computation resources in an edge-based cloud. 5G uses massive multiple input—multiple output (MIMO) antennae which are able to generate multiple targeted beams for each user or a group of users and such targeted beams may even follow devices as they traverse the coverage area. This permits reduced power consumption, improved coverage and bandwidth, lower latency (especially at network cloud edges) and increased capacity, thereby improving coverage, speed and capacity. 5G compliant radios on user equipment and UAVs communicate with the 5G network. Additionally, 5G will allow more uses of network access by internet of things devices.

5G networks may be architected such that 5G network slices, namely an end-to-end instance of a network, may be created for each user or a group of users. Such network slices provide full functionality and scalability for enterprise applications.

Moreover, network slices provide increased security.

5G networks may be characterized by lower-power cell sites and which such cell sites are compact and deployed more widely with less coverage area each than comparable 4G cell sites. Each cell site is connected to the network backbone and may operate on three different frequency bands, each with its on characteristics. The resultant connectivity is able to provide increases in speed and reduction in latency.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While the disclosure has been described in relation to a generic network, it will be understood that the systems and methods disclosed herein may be deployed in both cellular networks and information technology infrastructure and support current and future use cases. Moreover, the architecture may also be used by carrier or third-party vendors to augment networks on the edge.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A system comprising:
a plurality of hardware platforms, wherein the plurality of hardware platforms is configured to run a software defined network;
a plurality of virtual machines configured to be instantiated on the software defined network; and
a plurality of floating management layers, each of the floating management layers associated with one of the plurality of virtual machines, wherein each floating management layer is in communication with other virtual management layers, and wherein each virtual management layer comprises:
an input-output interface;
a processor coupled to the input-output interface wherein the processor is further coupled to a memory, the memory having stored thereon executable instructions that when executed by the processor cause the processor to effectuate operations comprising:
coupling an associated virtual machine of the plurality of virtual machines to one of the plurality of hardware platforms;
monitoring performance of the associated virtual machine;
detecting a trigger, the trigger being based on: a comparison between a first energy rate in a first geographic location where the one of the plurality of hardware platforms is located and a second energy rate in a second geographic location where a second of the plurality of hardware platforms is located, a heating of resources, hardware faults, delay or latency considerations, humidity, electromagnetic interference, and detection of a hardware attack or breach, the second energy rate being less than the first energy rate in terms of expense; and
based on the trigger, determining whether to move the virtual machine to the second of the plurality of hardware platforms,
wherein the trigger causes a movement of at least two of the plurality of virtual machines from at least two geographical areas to a cluster in a geographical area to reduce electrical consumption, and
wherein the movement of the at least two of the plurality of virtual machines is based on a use of machine learning and a historical data, wherein the historical data includes a historical record of previous moves of virtual machines to hardware resources, performance measurements before and after the previous moves, and loading and environmental conditions at the time of the previous moves.

2. The system of claim 1 wherein the determining comprises communicating with at least one other floating management layer.

3. The system of claim 2 wherein the communicating comprises determining if another virtual machine is scheduled to move to the second of the plurality of hardware platforms and the operations further comprise comparing performance of the associated virtual machine and the another virtual machine on the second of the plurality of hardware platforms.

4. The system of claim 3 wherein the operations further comprise selecting whether the associated virtual machine or the another virtual machine should move to the second of the plurality of hardware platforms based on the comparing.

5. The system of claim 2 wherein the communicating comprises communicating with the plurality of floating management layers and wherein the operations further comprise coordinating an interaction of the plurality of virtual machines.

6. The system of claim 2 wherein the communicating comprises communicating with the plurality of floating management layers and wherein the operations further comprise tracking locations of the plurality of virtual machines.

7. The system of claim 6 wherein the operations further comprise coordinating movement of one or more of the plurality of virtual machines to other of the plurality of hardware platforms.

8. The system of claim 1 wherein the operations further include moving the associated virtual machine to the second of the plurality of hardware platforms.

9. The system of claim 8 wherein the operations further include testing anticipated performance of the associated virtual machine on the second of the plurality of hardware platforms prior to the moving.

10. The system of claim 9 wherein the testing comprises comparing anticipated delay times of the associated virtual machine when running on the one of the plurality of hardware platforms and when running on the second of the plurality of hardware platforms.

11. The system of claim 1 wherein the trigger is based on a degradation of performance of the associated virtual machine.

12. The system of claim 1 wherein the trigger is based on one of a change in energy consumption, environmental conditions, or maintenance.

13. The system of claim 1 wherein the operations further comprising moving the associated virtual machine to the second of the plurality of hardware platforms before disabling operation of the associated virtual machine on the one of the plurality of hardware platforms.

14. A method, comprising:
instantiating a plurality of virtual machines on a plurality of hardware platforms;
attaching a floating management layer to each of the plurality of virtual machines;
coupling each virtual machine to one of the plurality of hardware platforms through the attached floating management layer;
monitoring performance of the plurality of virtual machines through each of the attached floating management layers;
detecting, based on the monitoring, a trigger, the trigger being based on: a comparison between a first energy rate in a first geographic location where one of the plurality of hardware platforms is located and a second energy rate in a second geographic location where a second of the plurality of hardware platforms is located, a heating of resources, hardware faults, delay or latency considerations, humidity, electromagnetic interference, and detection of a hardware attack or breach, the second energy rate being less than the first energy rate in terms of expense; and
coordinating, based on the detecting of the trigger, movement of the plurality of virtual machines among the plurality of hardware platforms,
wherein the trigger causes a movement of at least two of the plurality of virtual machines from at least two geographical areas to a cluster in a geographical area to reduce electrical consumption, and
wherein the movement of the at least two of the plurality of virtual machines is based on a use of machine learning and a historical data, wherein the historical data includes a historical record of previous moves of virtual machines to hardware resources, performance measurements before and after the previous moves, and loading and environmental conditions at the time of the previous moves.

15. The method of claim 14 wherein the trigger is detected by a first floating management layer and a second trigger is detected by a second floating management layer and where the coordinating comprises comparing anticipated performance of a first virtual machine attached to the first floating management layer and a second virtual machine attached to the second floating management layer on a targeted hardware platform.

16. The method of claim 15 further comprising moving the first virtual machine or the second virtual machine based on the comparing.

17. A system comprising:
a plurality of interconnected hardware platforms, wherein the plurality of interconnected hardware platforms is configured to run a software defined network;
a plurality of virtual machines configured to be instantiated on the software defined network; and
a plurality of floating management layers, each of the floating management layers configured to attach to each of the plurality of virtual machines, wherein each of the floating management layers is configured to couple an attached virtual machine of the plurality of virtual machines to one of the plurality of interconnected hardware platforms, and wherein at least one of the floating management layers is configured to move the attached virtual machine based on a trigger, the trigger being based on: a comparison between a first energy rate in a first geographic location where the one of the plurality of interconnected hardware platforms is located and a second energy rate in a second geographic location where a second of the plurality of interconnected hardware platforms is located, a heating of resources, hardware faults, delay or latency considerations, humidity, electromagnetic interference, and detection of a hardware attack or breach, the second energy rate being less than the first energy rate in terms of expense,
wherein the trigger causes a movement of at least two of the plurality of virtual machines from at least two geographical areas to a cluster in a geographical area to reduce electrical consumption, and
wherein the movement of the at least two of the plurality of virtual machines is based on a use of machine learning and a historical data, wherein the historical data includes a historical record of previous moves of virtual machines to hardware resources, performance measurements before and after the previous moves, and loading and environmental conditions at the time of the previous moves.

18. The system of claim 17 wherein the at least one of the floating management layers is configured to move the attached virtual machine to the second of the plurality of interconnected hardware platforms prior to disabling the attached virtual machine on the one of the plurality of interconnected hardware platforms.

* * * * *